Jan. 17, 1961 R. E. RICHARDSON 2,968,126
BLOWING FRAME FOR TEMPERING GLASS SHEETS
Filed June 18, 1956 2 Sheets-Sheet 1

INVENTOR:
RONALD E. RICHARDSON
BY Cushman, Darby & Cushman
ATTORNEYS

Jan. 17, 1961   R. E. RICHARDSON   2,968,126
BLOWING FRAME FOR TEMPERING GLASS SHEETS
Filed June 18, 1956   2 Sheets-Sheet 2
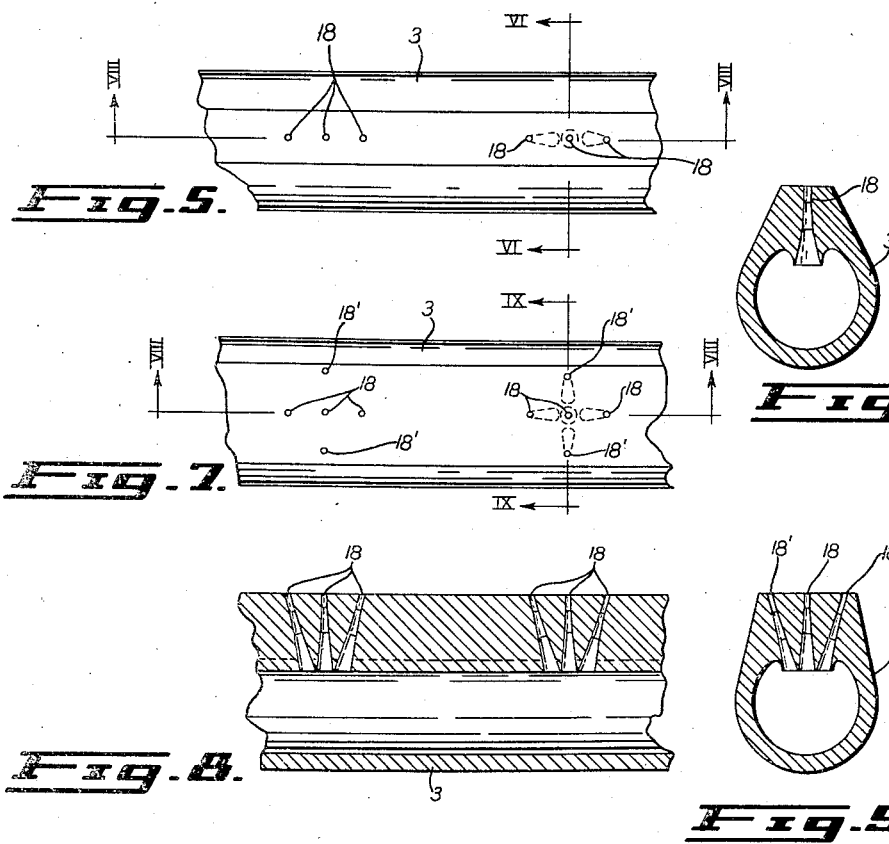
INVENTOR
RONALD E. RICHARDSON
BY
Cushman, Darby & Cushman
ATTORNEYS

United States Patent Office 2,968,126
Patented Jan. 17, 1961

2,968,126
BLOWING FRAME FOR TEMPERING GLASS SHEETS

Ronald E. Richardson, Oshawa, Ontario, Canada, assignor to Pittsburgh Plate Glass Company, Pittsburgh, Pa.

Filed June 18, 1956, Ser. No. 592,112

Claims priority, application Canada Aug. 15, 1955

1 Claim. (Cl. 49—45)

This invention relates to improvements in apparatus for rapidly cooling heated glass as a step in the manufacture of tempered safety glass.

Such treatment involves the heating of each glass sheet individually in a furnace, with subsequent rapid cooling effected by the application of a large number of small jets of cold air that are caused to play on the surfaces of the glass. In conventional machines for carrying out this treatment, the glass sheet is either held vertical or horizontal, after having been withdrawn from the furnace, to be positioned between a pair of blowing frames each of which consists of a large number of closely spaced, generally parallel air pipes, each pipe having a series of holes disposed along its length to form nozzles. These frames are mounted so that the jets of air project from the nozzles substantially normal to the surface of the glass sheet and parallel to one another (at least adjacent jets are generally parallel—those at widely spaced parts of the frame may be appreciably inclined to each other if the glass sheet is curved). The spacing between the nozzles and the glass surface is usually of the order of a few inches.

In many machines it is arranged that each of these blowing frames be continually subjected to oscillation, preferably a rotary oscillation, so that the local area of the sheet receiving the jet of air from each nozzle is continually varying as the nozzles move. When the oscillation is rotary, the diameter of the circles in which the nozzles move is comparatively small and of the same order of magnitude as the spacing between adjacent nozzles. In this way it is possible to play the air in small jets over the entire surface of the glass, and to cool the glass quickly, as is essential if the desired final properties are to be obtained. Some manufacturers dispense with oscillation altogether, and it cannot therefore be considered as an essential feature of the process, although with present installations it is considered desirable as resulting in a better finished product.

Difficulties have begun to be experienced in glass tempering machines of this type, when the shape of the glass deviates substantially from that of a flat sheet, and especially when the shape of the glass involves comparatively small radius curves with parts of the sheet extending at an appreciable angle to the remainder of the sheet. A particular example of such a shape is that now becoming commonly adopted for the rear windows of automobiles. It is desired to avoid as far as possible continually changing the blowing frame as various batches of differently shaped glass pass through the machine, and thus it would be advantageous to have a machine in which it is not essential for each frame to follow too closely the contour of the glass. On the other hand, if the shape of the frame does not follow accurately the contour of the glass, the distance that the various air jets must travel between their nozzles and the glass surface (the "throw"), will vary over different portions of the glass, and too great a deviation between the throw of different jets has been found in existing machines to give rise to lack of uniformity in the tempering of the glass.

The present invention is concerned with an improved structure of nozzle in blowing frames for use in tempering glass sheets. In particular, it is an object of the invention to provide a construction of nozzle that will provide greater throw than has hitherto been obtainable in practice, without extensive spreading of the air. In obtaining a satisfactory tempered glass, it is just as important to provide for escape of the heated air that has just been in contact with the glass surface than to provide for the continued application of fresh cool air. If the heated air cannot escape rapidly, a condition known as "snuffing" occurs, the new air from the nozzles not coming into adequate cooling contact with the glass surface, since the warm air that cannot escape tends to form a cushion protecting such surface. The nozzles on a blowing frame must be comparatively close together in order to provide for complete coverage of the glass surface, and there is, therefore, only a limited amount of space between the nozzles for escape of the warm air. It is thus important that the jet of air thrown by each nozzle should be comparatively narrow, in order to leave sufficient space between each pair of adjacent jets for the warm air to flow in the reverse direction away from the glass. If the jets of all adjacent nozzles were to overlap, "snuffing" would be inevitable, and the necessity of providing a jet of air of comparatively narrow transverse dimension is thus evident.

Another requirement often important in practice is that the nozzles should be suitable for use with a comparatively low air pressure, say of the order of six to eight pounds per square inch, since this is the pressure usually most cheaply available in air tempering installations. Some installations use very high pressures, but this involves compressors, whereas six to eight pounds per square inch can be produced from turbines. Turbine produced air will normally prove cheaper, and low pressures will eliminate the need for reducing valves, while avoiding the pressure fluctuations commonly associated with high pressure systems.

It has now been discovered that considerable improvement in respect of the throw obtained from a nozzle, can be realised, if the passageway that constitutes the nozzle is made convergent from the inside of the pipe outwardly. The steepness of this convergence, or taper, will preferably be decreased towards the outer end of the passageway, for best results.

Another object of the invention is to provide a method by which oscillation can be dispensed with, without significant loss of quality in the finished product. To be able to dispense with oscillation is obviously a desirable aim, if for no other reason than to eliminate the moving parts involved and simplify the apparatus. But more important than this reason are the difficulties that oscillation introduces when the glass shape is complicated, for example, when the object under treatment is an automobile rear window. Attempts have been made to provide compound oscillatory motions for frames used in tempering complex bent glass parts, and in general these attempts have been technically successful, but such frames are subject to high maintenance costs in service. The possibility of being able to dispense with oscillation altogether is very attractive to a manufacturer of tempered safety glass.

It will be recalled that in the foregoing description of a conventional blowing frame, it was stated that the nozzles are arranged with equal spacing and with adjacent nozzles extending substantially parallel with one another.

In accordance with a further feature of the present invention, the nozzles may be bunched together in groups, the individual jets of each group diverging from one another so as to be separate from one another and substantially regularly spaced at the far end of the "throw." By this expedient, it is found that a closer spacing of nozzles, i.e. more nozzles per unit area of frame, can be employed with less danger of "snuffing." There will be less call for oscillation of the frame when a higher density of jets can be obtained, and, although bunching of the nozzles may not necessarily lead entirely to the elimination of frame oscillation in all applications, it is believed that it will reduce the need for frame oscillation, or conversely minimize any deleterious effects that would otherwise result from absence of such oscillation.

The accompanying drawings illustrate by way of example one manner in which the invention may be carried into practice. In these drawings:

Figure 5 is a front view of the air pipe seen in Figure 4.

Figure 6 is a section on the line VI—VI in Figure 5.

Figure 7 is a view similar to Figure 5 showing a modification.

Figure 8 is a view taken on the line VIII—VIII in either Figure 5 or Figure 7.

Figure 9 is a section on the line IX—IX in Figure 7.

Figure 1:
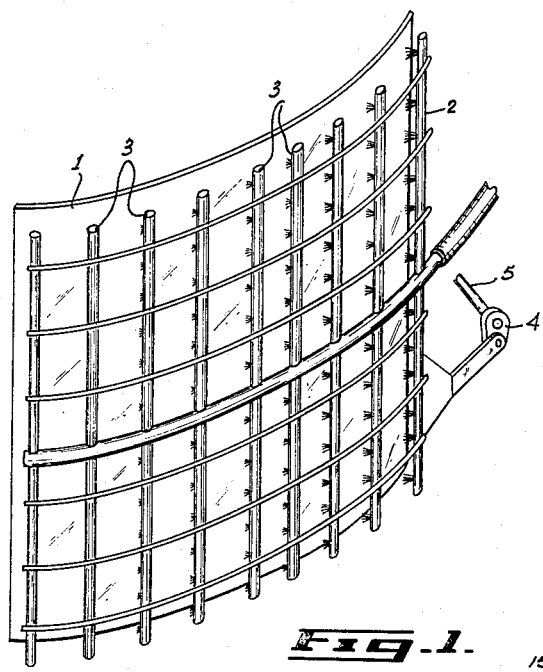
Figure 1 shows diagrammatically a perspective view of the main elements of a typical blowing frame mounted in a glass tempering machine of the vertical type.

Figure 1, which is provided merely by way of further explanation of the foregoing remarks to illustrate in broad terms the structure of a blowing frame, shows a sheet of glass 1 suspended before a blowing frame 2 which consists of a series of parallel pipes 3 each formed with a number of nozzles directed towards the glass surfaces. A crank-arm 4 and a shaft 5 are also shown to provide diagrammatic illustration of mechanism for moving the frame 2 orbitally in order to play the air jets over the entire surface of the glass 1. This general structure is conventional, a second blowing frame (not shown) being provided on the other side of the glass sheet for treatment of the other surface.

Figure 2:
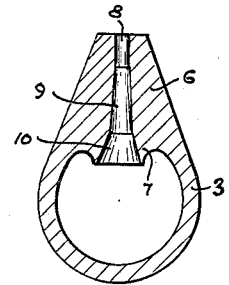
Figure 2 shows a transverse cross-section of one of the tempering pipes of this frame, taken along the centre of a nozzle constructed in accordance with the present invention.

It is now proposed to consider the particular shape of the passageways constituting the nozzles formed in the so-called tempering pipes 3. A cross section of one of these pipes is seen in Figure 2 and it will be apparent that such pipes are of complex shape consisting of a generally cylindrical portion formed with an enlarged protruding section 6 along one side. These pipes will conveniently be manufactured as extruded aluminum tubes. It is also important to note that there is a re-entrant ridge 7 extending towards the centre of the pipe radially inwardly of the protruding ridge 6. At intervals along the pipe 3 there are formed passageways which extend through the protruding and re-entrant ridges 6 and 7 to communicate between the interior of the pipe and the exterior thereof. Each such passageway is formed in three portions, namely a truly cylindrical end portion 8 at its exit end, a gently tapered intermediate portion 9 and a more steeply tapered inner portion 10 formed within the ridge 7. These three portions are coaxial with each other and their surfaces merge smoothly into one another. It has been found practical to form the passageways in these separate portions as a convenient method of providing a passageway having a taper the degree of inclination of which is gradually decreased to zero. It would be difficult to bore a hole of smoothly decreasing taper in one single operation and a satisfactory approximation to such a shape is obtained by the use of the two differently tapered portions 9 and 10 and the cylindrical portion 8. It may be practical to form these holes by means of tools passed along the pipe from one end, but it will normally be simplest to bore a hole in the rear surface of the pipe in alignment with the position to be occupied by the passageway, and, after boring the three portions, to replace the metal removed from the rear of the pipe and make an air-tight connection.

The purpose of the re-entrant ridge 7 is two-fold; firstly to insure that each passageway will collect air from the centre of the air stream in the pipe 3; and secondly, to allow a comparatively long passageway to be formed with minimum increase in the overall dimensions of the pipe.

Figure 3:
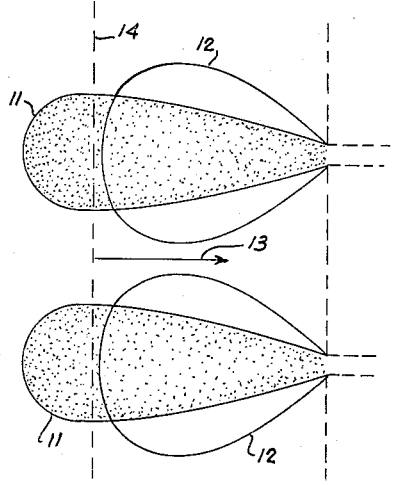
Figure 3 is a diagram illustrating generally the types of air jets that may be expected with nozzles of the type previously used and with those provided by the invention.

Figure 3 serves to illustrate diagrammatically the improved form of air jet obtained by means of a nozzle formed in accordance with the invention. The envelope 11 seen in this figure represents the form of jet obtained with a nozzle according to the present invention, compared with the envelope 12 of a jet obtained when using a conventional purely cylindrical passageway to form the nozzle. The greater throw of the jet 11 is most noticeable. It has been found in practice that, when using nozzles according to the invention, the distance between the blowing frame and the glass surface can be significantly increased without giving rise to "snuffing," other factors being equal. The return path available for the heated air between a pair of adjacent nozzles is shown by the arrow 13 in Figure 3. In order that the velocity of the air should not be too low when striking the glass, the glass will normally be positioned in relation to the jet 11 somewhat as indicated by the broken line 14 in Figure 3. This ability to have the glass rather further away from the frame simplifies the practical problems discussed above which arise when dealing with complex glass shapes. Moreover, the new form of nozzle is expected to be more economical of power, since less cool air will be wasted by dissipation to the sides of the nozzles.

Figure 4:
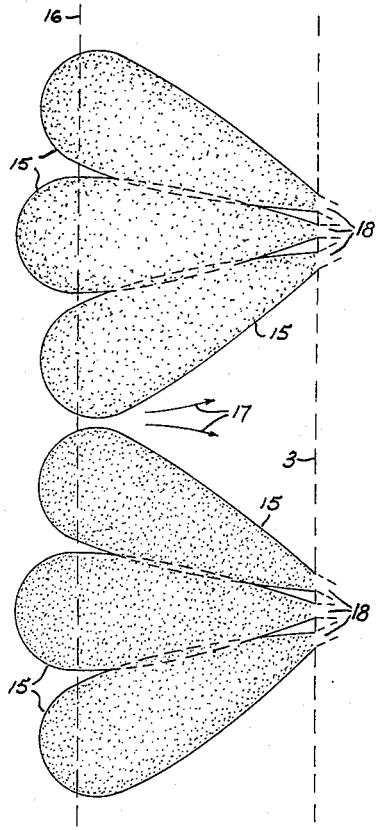
Figure 4 is a diagram illustrating a series of air jets obtained with nozzles according to the present invention and demonstrating the "bunching" feature of the invention.

Figures 4–9 serve to illustrate a further feature of the invention, namely the "bunching" feature. Figure 4 shows a series of envelopes 15 each similar to an envelope 11 in that it serves generally to represent the form of jet obtained with a nozzle 18 according to the invention. These nozzles 18 are, however, arranged differently along the pipe 3 of the blowing frame, in that, instead of being uniformly spaced along such pipe, as has been conventional, they are bunched together into groups, the jets of each group diverging away from one another as they extend away from the pipe 3. Figures 4, 5 and 8 show two such groups of jets, and thus serve to illustrate the relative position along the pipe 3 of each group of nozzles 18. Figures 7 and 9 illustrate a modification which consists of a central jet surrounded annularly by a series of divergent jets. This effect is produced by nozzles 18 as previously described and additional nozzles 18'.

One purpose of such grouping is to enable the air streams of each jet to reinforce each other during the initial portion of their passage across the "throw" distance and thus tend to increase the throw. By arranging the jets with proper divergent angles, it can be arranged that the jets will be evenly spaced from each other by the time they have reached points, indicated by the broken line 16 (shown in Figure 4), at which they will strike the glass. This method of grouping the jets together is believed not only to aid in transporting the air from the tubes towards the glass, but conversely, also to aid in removal of the spent air, and thus to reduce the likelihood of "snuffing." The greater facility for the air to escape follows from the relatively large and divergent return space through which the spent air may flow, as indicated by the arrows 17 (seen in Figure 4).

It follows from the increased return space for the spent air provided by the grouping of the jets, that it will prove possible to group the jets rather more closely than has hitherto been possible, i.e. more nozzles per unit area of the frame, without diminishing facilities for return air to a degree that will give rise to snuffing. Closer grouping of the jets will in turn tend to reduce the need for oscillation of the frame, or will minimize any deleterious effects on the treatment of the glass that might otherwise result from the omission of oscillation.

I claim:

A blowing frame for tempering glass sheets, said frame comprising a plurality of tempering pipes, the longitudinal axes of said pipes being substantially parallel to one another, each of said pipes having a plurality of passageways forming a plurality of sets of spaced nozzles, each such passageway extending from the interior to the exterior of a said pipe at an angle to the longitudinal axis of said pipe, each such passageway tapering in the direction of air flow from the interior to the exterior of its pipe, and each such passageway comprising at least three coaxial portions including an innermost portion of maximum taper, an intermediate portion of intermediate taper and an outermost portion of minimum taper, said portions merging one into the other to provide said passageway with an approximation to a continuously curved inwardly bowed tapering wall structure.

References Cited in the file of this patent

UNITED STATES PATENTS

| | | |
|---|---|---|
| 71,756 | Hofer | Dec. 3, 1867 |
| 2,131,406 | Mosmieri et al. | Sept. 27, 1938 |
| 2,225,521 | Holveck | Dec. 17, 1940 |
| 2,271,327 | Chirgwin | Jan. 27, 1942 |
| 2,314,525 | Summers | Mar. 23, 1943 |
| 2,677,918 | Bird et al. | May 11, 1954 |
| 2,746,792 | Hough | May 22, 1956 |

FOREIGN PATENTS

| | | |
|---|---|---|
| 172,946 | Great Britain | Aug. 17, 1922 |
| 411,894 | Italy | July 19, 1945 |
| 586,497 | Great Britain | Mar. 20, 1947 |
| 953,053 | France | May 16, 1949 |